US009605635B2

(12) United States Patent
Park et al.

(10) Patent No.: US 9,605,635 B2
(45) Date of Patent: Mar. 28, 2017

(54) TWO-PHASE FUEL INJECTION VALVE FOR DIESEL ENGINE AND GAS ENGINE INCLUDING NOZZLE HAVING PUMPING FUNCTION

(75) Inventors: Deuk-Jin Park, Ulsan (KR); Eung-Sung Kim, Ulsan (KR); Ju-Tae Kim, Ulsan (KR); Kwang-Cheol Heo, Ulsan (KR); Jong-Suk Kim, Ulsan (KR); Eun Ha, Ulsan (KR)

(73) Assignee: HYUNDAI HEAVY INDUSTRIES, CO., LTD., Ulsan (KR)

( * ) Notice: Subject to any disclaimer, the term of this patent is extended or adjusted under 35 U.S.C. 154(b) by 862 days.

(21) Appl. No.: 13/806,547

(22) PCT Filed: Oct. 28, 2010

(86) PCT No.: PCT/KR2010/007436
§ 371 (c)(1),
(2), (4) Date: Dec. 21, 2012

(87) PCT Pub. No.: WO2012/002620
PCT Pub. Date: Jan. 5, 2012

(65) Prior Publication Data
US 2013/0139790 A1    Jun. 6, 2013

(30) Foreign Application Priority Data

Jul. 2, 2010  (KR) .......................... 10-2010-0063772

(51) Int. Cl.
*F02M 59/00*      (2006.01)
*F02D 19/08*      (2006.01)
(Continued)

(52) U.S. Cl.
CPC ........... *F02M 59/00* (2013.01); *F02D 19/061* (2013.01); *F02D 19/0642* (2013.01);
(Continued)

(58) Field of Classification Search
CPC .. F02M 43/04; F02M 45/086; F02M 2200/44; F02M 59/00; F02M 21/0263;
(Continued)

(56) References Cited

U.S. PATENT DOCUMENTS 4,499,861 A * 2/1985 Wiegand ................ F02M 43/04
                                                  123/1 A
4,499,862 A * 2/1985 Baumer ................. F02M 43/04
                                                  123/1 A
(Continued)

FOREIGN PATENT DOCUMENTS

DE           3540780 A1 *  5/1987 ........... F02D 19/081
DE       EP 0575887 B1 *  3/1997 ............. F02M 43/04
(Continued)

*Primary Examiner* — Mahmoud Gimie
*Assistant Examiner* — John Zaleskas
(74) *Attorney, Agent, or Firm* — Rabin & Berdo, P.C.

(57) ABSTRACT

A dual fuel injection valve includes a primary fuel treatment space and a secondary fuel treatment space formed extending the fuel valve block and the hybrid nozzle block in the longitudinal direction and side by side with each other. The primary fuel treatment space includes a primary cylinder passage, a primary fuel passage and a primary nozzle hole. The secondary fuel treatment space includes a secondary cylinder passage formed separately form the primary cylinder passage, a secondary fuel passage formed separately form the primary fuel passage hole, a secondary nozzle hole. The dual fuel injection valve further includes a first chamber formed in a lower portion of the secondary cylinder passage, a second chamber disposed between the first chamber and the secondary nozzle hole and formed to surround the secondary cylinder passage, and a primary fuel movement hole connecting the primary cylinder passage and the second chamber.

3 Claims, 8 Drawing Sheets

(51) Int. Cl.
*F02M 43/04* (2006.01)
*F02M 45/08* (2006.01)
*F02M 61/10* (2006.01)
*F02D 19/06* (2006.01)

(52) U.S. Cl.
CPC ..... *F02D 19/0689* (2013.01); *F02D 19/0694* (2013.01); *F02D 19/081* (2013.01); *F02M 43/04* (2013.01); *F02M 45/086* (2013.01); *F02M 61/10* (2013.01); *F02M 2200/44* (2013.01); *Y02T 10/36* (2013.01)

(58) Field of Classification Search
CPC ............... F02D 19/061; F02D 19/0642; F02D 19/0644; F02D 19/0647; F02D 19/0689; F02D 19/0694; Y02T 10/36
USPC ... 123/27 GE, 299, 300, 304, 305, 525, 575; 239/533.2, 533.3, 533.8, 533.9, 584, 239/585.1, 585.5
See application file for complete search history.

(56) References Cited

U.S. PATENT DOCUMENTS

| | | | | |
|---|---|---|---|---|
| 4,700,672 A | * | 10/1987 | Baguena | F02D 19/0684 123/299 |
| 4,856,713 A | * | 8/1989 | Burnett | F02M 43/04 123/23 |
| 5,199,398 A | * | 4/1993 | Nylund | F02M 43/04 123/299 |
| 5,458,292 A | * | 10/1995 | Hapeman | F02M 45/086 239/533.4 |
| 5,647,316 A | * | 7/1997 | Hellen | F02M 43/00 123/25 C |
| 5,862,793 A | * | 1/1999 | Jay | F02M 43/04 123/25 C |
| 5,996,558 A | * | 12/1999 | Ouellette | F02D 19/10 123/27 GE |
| 6,073,862 A | * | 6/2000 | Touchette | F02D 19/10 239/408 |
| 6,336,598 B1 | * | 1/2002 | Touchette | F02D 19/10 239/408 |
| 6,484,699 B2 | | 11/2002 | Paul et al. | |
| 6,761,325 B2 | * | 7/2004 | Baker | F02M 43/02 239/533.2 |
| 7,124,959 B2 | * | 10/2006 | Baker | F02M 43/02 239/5 |
| 7,556,017 B2 | * | 7/2009 | Gibson | F02M 47/027 123/299 |
| 2002/0002967 A1 | | 1/2002 | Paul et al. | |
| 2002/0070295 A1 | | 6/2002 | Baker et al. | |
| 2003/0010320 A1 | | 1/2003 | Gillis et al. | |
| 2004/0118116 A1 | * | 6/2004 | Beck | F02B 1/12 60/601 |
| 2004/0144339 A1 | * | 7/2004 | Hattori | F02M 25/03 123/25 C |
| 2004/0256495 A1 | | 12/2004 | Baker et al. | |
| 2005/0224601 A1 | * | 10/2005 | Baker | F02D 19/0605 239/132.5 |
| 2006/0236974 A1 | * | 10/2006 | Randall | F02M 53/08 123/299 |
| 2009/0020631 A1 | * | 1/2009 | Mashida | F02D 19/10 239/533.3 |
| 2009/0134246 A1 | * | 5/2009 | Cooke | F02D 19/0694 239/533.12 |
| 2010/0199948 A1 | * | 8/2010 | Rogak | F02D 19/0647 123/304 |

FOREIGN PATENT DOCUMENTS

| | | | | |
|---|---|---|---|---|
| DE | 102007028091 A1 | * | 12/2008 | ......... F02D 19/0684 |
| EP | 1 274 933 B1 | | 10/2004 | |
| FI | EP 0778410 B1 | * | 3/2000 | ............ F02D 19/10 |
| JP | 61229969 A | * | 10/1986 | |
| JP | 63208664 A | * | 8/1988 | |
| JP | 06-010787 A | | 1/1994 | |
| JP | 07-174056 A | | 7/1995 | |
| JP | 09-126084 A | | 5/1997 | |
| JP | 3368275 B2 | * | 1/2003 | ............ F02M 43/04 |
| KR | 10-0299288 B1 | | 6/2002 | |
| KR | 20070087026 A | * | 8/2007 | ............ F02M 25/03 |

* cited by examiner

TWO-PHASE FUEL INJECTION VALVE FOR DIESEL ENGINE AND GAS ENGINE INCLUDING NOZZLE HAVING PUMPING FUNCTION

TECHNICAL FIELD

The present invention relates to a dual fuel injection valve including a nozzle having pumping structure for a diesel engine or a gas engine and, more particularly, to a hybrid type fuel injection valve which enables a primary fuel to be injected by using the internal pumping structure instead of using an external pressure pump and uses pressure used in the primary fuel injection as pumping pressure for a secondary fuel injection.

BACKGROUND ART

Generally, a conventional diesel engine has one needle valve and one spring, wherein the needle valve is opened when pressure of fuel being introduced is higher than opening pressure of the needle valve and is closed when the pressure of the fuel is lower than the opening pressure. In this manner, when fuel of high pressure formed by a fuel pump enters to a fuel valve, and if the pressure of the fuel in the fuel valve is higher than the opening pressure of the fuel valve, the spring lifts the needle valve against a force pressing against the needle valve through the pressure of the fuel, such that the fuel is injected into a cylinder through multiple nozzle holes located on an end of a nozzle.

Such a method consists of one mechanism in which all nozzle holes are opened at a predefined opening pressure, and thus, after the opening pressure is formed, even if fuel of higher pressure is introduced to the fuel valve, the injection of the fuel should be continued through all of the nozzle holes.

Meanwhile, in case of a gas engine, two fuel injection valves, one for a pilot valve and the other for a valve for gas, or two needle cylinders are provided to be used, and in order to provide two fuel supply paths corresponding thereto, pipe lines that conform to the two valves needs to be installed, thereby requiring two governors for timing control, a linkage device, etc.

FIG. 8 illustrates a Wartsila-Sulzer approach, an MAN-B & W approach, and a medium sized engine which is a typical form of a conventional fuel valve.

In the Wartsila-Sulzer approach, when pressure of fuel is greater than the opening pressure of the fuel valve but not high enough, the fuel flows into the cylinder, rather than being injected into the cylinder through multiple nozzle holes fabricated on the nozzle. Also, even after the fuel injection is finished, since a space (SAC volume) between the closed needle valve and the nozzle hole is large, residual fuel remaining in this space flows into the cylinder, thereby causing the problem as described above.

Also, in the MAN-B&W approach, a needle valve in a slide type is adopted to reduce the SAC volume; however, the MAN-B&W approach has the limitation that pressure over the opening pressure cannot be actively coped with. In other words, the SAC volume is fixed.

Also, in a case of the medium sized engine, the above described MAN-M&W approach and the Wartsila-Sulzer approach are complemented by forming an injection hole to be located near a combustion chamber to a maximum extent in order to reduce the SAC volume, which causes a problem that the durability of a nozzle portion in opening and closing the needle is degraded.

Namely, the above described approaches have disadvantages that, as shown in FIG. 8, in order to open at a predetermined pressure, spring pressure is increased and fuel pressure is manipulated to increase to adjust the opening pressure in a device other than the fuel valve (i.e., pressure is not increased by the fuel valve itself but increased by using an additional pump located in front of an entrance of the fuel valve), and only one kind of fuel is used.

Also, a fuel injection valve in a dual fuel type, such as dual fuel injection apparatuses 1 and 2 shown in a lower portion of FIG. 8, has two cylinders, so that two governors and two linkages are required, and two high pressure pumps are required in order to form high pressure of primary fuel and secondary fuel, and a separate line for cooling needs to be formed within an injector, thereby causing a complex structure.

DISCLOSURE

Technical Problem

Therefore, an objective of the present invention is to provide a dual fuel injection valve in which, by using two kinds of fuel entering into the dual fuel injection valve, a warming up and pilot injection is performed in an initial injection, and injection of main fuel is performed subsequently such that said two kinds of fuel are used one after another for combustion, thereby increasing fuel injection performance.

Also, another objective of the present invention is to provide a dual fuel injection valve in a hybrid structure in which, instead of requiring two kinds of separate pump devices, one pump is used to press a piston and inject primary fuel, and the pressure by the pump opens a needle valve of secondary fuel to inject the secondary fuel, thereby increasing fuel efficiency to reduce harmful gas (smoke, NOx).

Technical Solution

In accordance with an aspect of the present invention which achieves the above objectives and solves the disadvantages in the prior art, provided is a dual fuel injection valve including a nozzle having a pumping structure for a diesel engine or a gas engine, in a fuel injection valve for the diesel engine or the gas engine for injecting fuel to a cylinder. also, the dual fuel injection valve includes a fuel valve block in which fuel passages to which primary and secondary fuel are introduced through a high pressure pipe are formed inside thereof, wherein the primary and secondary fuel may be the same kind of fuel or different kind of fuel; a cylinder/needle valve which moves upward by pressure of the secondary fuel introduced through a secondary fuel passage formed in the fuel valve block to inject the primary fuel to a pilot nozzle hole; and a main needle valve which moves upward by the pressure of the secondary fuel introduced, after injecting the primary fuel by pressing the cylinder/needle valve, through the secondary fuel passage to inject the secondary fuel to a main nozzle hole.

The present invention is characterized in that the cylinder/needle valve includes a cylindrical hole formed inside an upper portion thereof, that is, cylindrical head; a primary fuel pressing piston having a lower portion movably inserted to the cylindrical head and a fuel pressing hole formed at a certain point thereof such that the fuel pressing hole allows the primary fuel to flow into a lower portion of the cylindrical hole when the primary fuel pressing piston is inserted into the cylindrical hole, the primary fuel pressing piston being elastically supported by a primary fuel piston spring; a pressure piston connected to a residual pressure maintaining valve and a secondary fuel passage and configured to receive pressure of the secondary fuel and to press an upper portion of the primary fuel pressing piston; and the residual pressure maintaining valve of which upper portion is connected to the secondary fuel passage in order to restore the pressure piston which is pressed for injecting the primary fuel.

The present invention is characterized in that, when the primary fuel cylinder/needle valve is closed, the primary fuel is switched to lower pressure such that the primary fuel is drained outside the injection valve through a primary fuel drain line via an area of a chamber A, which is an area for cooling the secondary fuel and located at a lower portion of the main needle valve.

The present invention is characterized in that a bush is installed around the main needle valve 143 such that the bush 130 prevents the primary fuel, which is pilot fuel, from mixing with the secondary fuel, which is main fuel, introduced to a chamber B 302 and serves as a medium for cooling a main nozzle hole 161 at an area of a chamber A 301 by the heat exchanging.

Advantageous Effects

As described above, the present invention has advantages in that a dual fuel injection apparatus used in an engine which uses dual fuel does not require two separate pumps, Thus, only one pumping structure is operated within a fuel valve block so as to move two needles, thereby enabling pumping at high pressure and enabling pumping dual fuel at high pressure for injection.

Also, the present invention has a significant industrial applicability since the present invention has advantages in that two kinds of fuel are sequentially injected, without mixing with each other, to an inside of a combustion chamber to be combusted such that a combustion pattern using two kinds of fuel, i.e., marine diesel oil (MDO)+heavy fuel oil (HFO) and MDO+gas fuel is achieved, thereby reducing harmful gas (smoke, Nox) within the combustion chamber and improving fuel efficiency.

Figure 1:
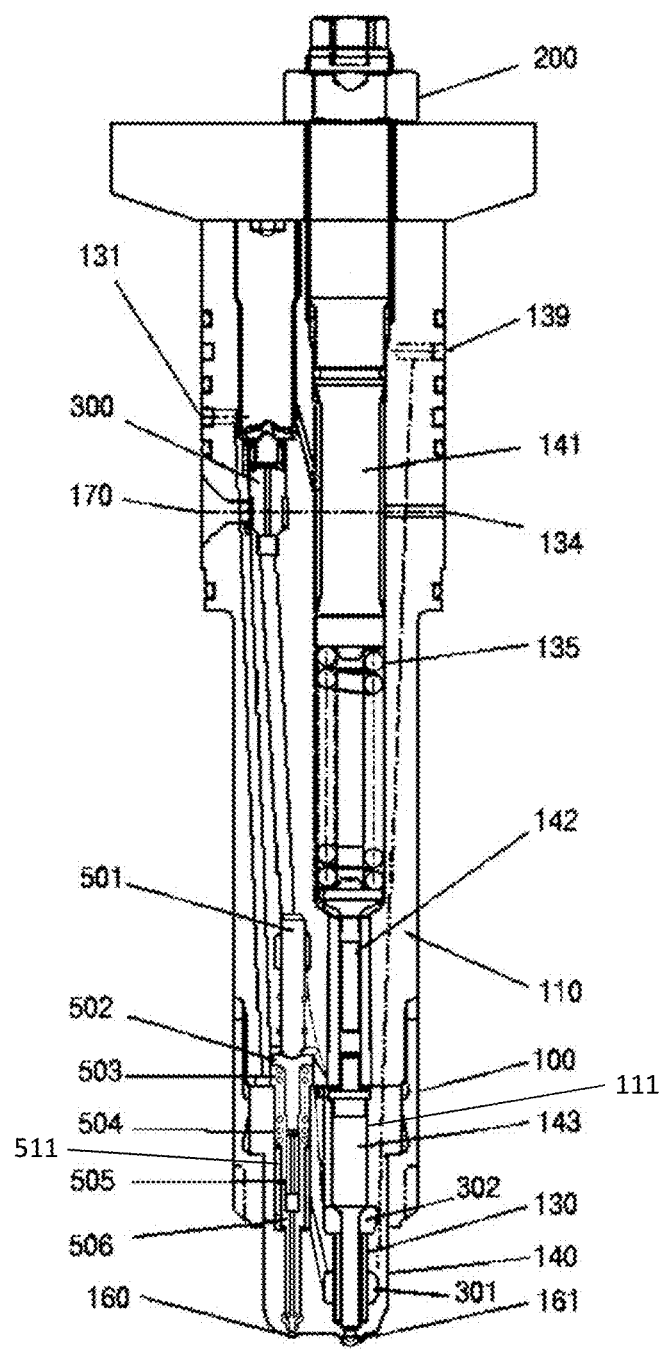
FIG. 1 is a cross sectional view illustrating an exemplary embodiment of the present invention.

DESCRIPTION OF SYMBOLS (100): Nozzle holder
(110): Fuel valve block
(130): Bush
(131): Primary fuel passage
(134): Drain line
(135): Needle spring
(139): Primary fuel drain line
(140): Dual hybrid nozzle block
(141): Spring tension adjustment bolt
(142): Spring support
(143): Main needle valve
(160): Pilot nozzle hole
(161): Main nozzle hole
(170): Secondary fuel passage pipe
(200): Tension adjustment nut
(300): Residual pressure maintaining valve
(501): Pressure piston
(502): Primary fuel pressing piston
(503): Primary fuel pressing piston spring
(504): Fuel pressing hole
(505): Cylindrical head
(506): Cylinder/needle valve
(301): Chamber A
(302): Chamber B

MODE FOR INVENTION

Hereinafter, exemplary embodiments of the present invention will be described herein below with reference to the accompanying drawings. Further, in the following description of the present invention, a detailed description of associated known functions or elements will be omitted when it may make the subject matter of the present invention rather unclear.

Figure 2:
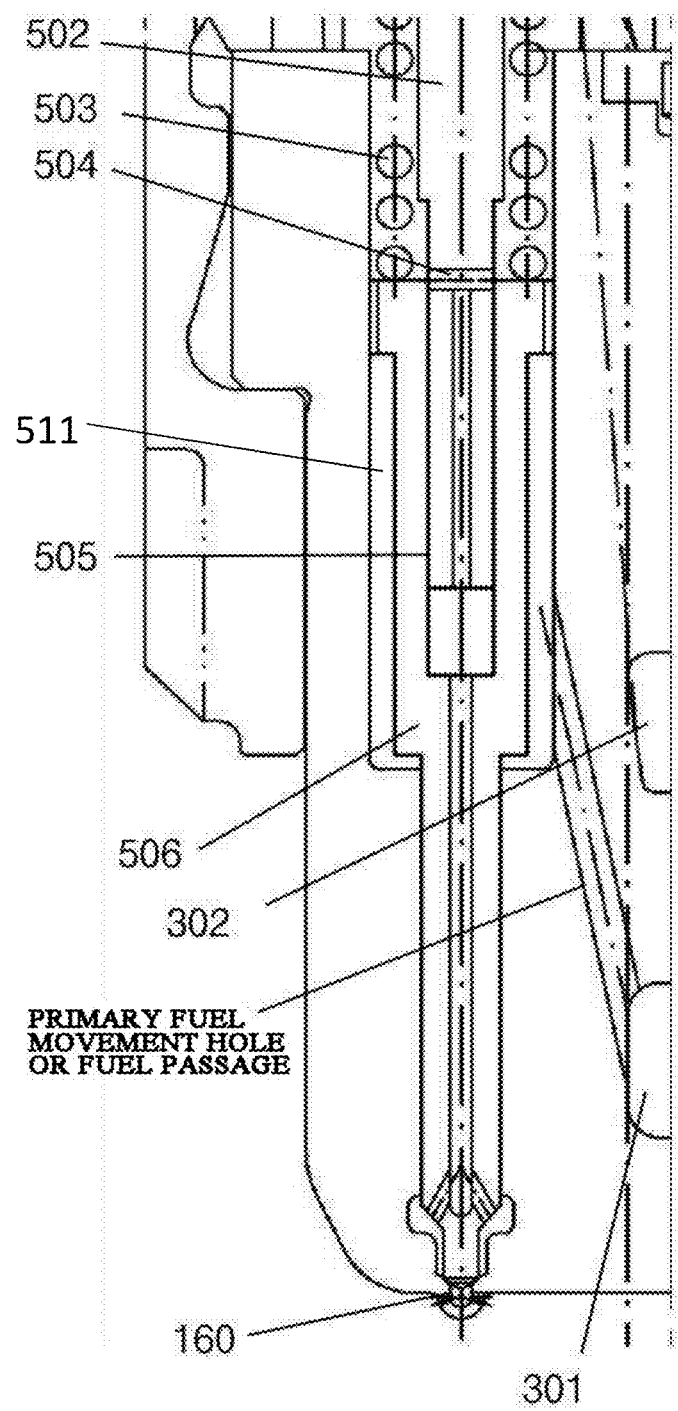
FIG. 2 is an enlarged view of a portion of FIG. 1.

FIG. 1 is a cross sectional view illustrating an exemplary embodiment of the present invention and FIG. 2 is an enlarged view of a portion of FIG. 1. As illustrated, the configuration of the present invention relates to a dual fuel injection valve capable of injecting fuels of the same kind or a different kind. The present invention can be applied to an engine, such as an engine for a large vessel, a medium sized engine or a gas engine, injecting two kinds of fuel. Also, since a position of a needle valve is extended to a bottom of a nozzle, an SAC volume is minimized, thereby providing a diesel engine and a gas engine having improved combustion performance and higher fuel efficiency.

Also, in using primary fuel and secondary fuel, instead of using an external high pressure pump or controlling the dual fuel by an additional electronic apparatus, an internal pumping, which is a main feature of the present invention, is produced by the secondary fuel to pump and inject the primary fuel, and the injected primary fuel is used to cool high temperature around the secondary fuel.

To this end, the present invention includes a fuel valve block 110 having fuel passages formed inside thereof, wherein the primary fuel and the secondary fuel are introduced thereto through a high pressure pipe, a nozzle holder 100 surrounding an entire fuel valve block 110, a primary fuel piston spring 503 which operates to move upward or downward according to pressure of the secondary fuel, a needle spring 135, a cylinder/needle valve 506 (also referred as a primary needle valve) which is moved upward or downward by the pressure of the secondary fuel to inject the primary fuel, a main needle valve 143 which injects the secondary fuel by moving upward or downward according to the pressure of the secondary fuel which has already injected the primary fuel, a pilot nozzle hole 160 (also referred as the primary nozzle hole) which injects the primary fuel, which is the pilot fuel, to a cylinder located at a lower portion thereof, and a dual hybrid nozzle block 140 on which a main nozzle hole 161 is fabricated, wherein the main nozzle hole 161 injects the secondary fuel, which is the main fuel, to the cylinder located at the lower portion thereof.

In the present invention having the above configuration, the dual fuel, i.e., fuel such as heavy fuel oil (HFO), marine diesel oil (MDO) used in the diesel engine and gas fuel using a natural gas, can be injected from two nozzles within one fuel injection valve block. Thus, an efficient injection is possible even when HFO is used as the secondary fuel, which is the main fuel, and MDO is used as the primary fuel, which is the pilot fuel.

Also, when using the dual fuel, the MDO may be used as the primary fuel for ignition and a gas may be used as the secondary fuel, which is the main fuel, for injection.

Specifically, a spring tension bolt 141 for adjusting pressure of the needle spring 135 is installed inside a cylinder in which secondary fuel system elements are installed and a tension adjustment nut 200 for controlling and fixing a tension adjustment state by the spring tension bolt 141 is installed at an upper portion thereof.

The primary fuel used in the present invention stands by at a low pressure through a primary fuel passage 131 up to the primary nozzle hole 160, and this fuel serves to cool the secondary fuel while circulating within the injection valve block.

When the secondary fuel, which is the main fuel introduced through a secondary fuel passage 170, pushes a pressure piston 501 for pressing the primary fuel (MDO, diesel fuel, etc.) by pressure received from a pump, a primary fuel pressing piston 502, which is a main piston that is supported by the primary fuel piston spring 503, is moved downward to press the primary fuel in the cylinder/needle valve 506 at high pressure such that the cylinder/needle valve 506 is operated by a pressure difference per cross section area to inject the primary fuel through the pilot nozzle hole 160 which is a primary fuel injection hole.

When the injection is completed, the pressure piston 501 which presses the primary fuel needs to be restored, and to this end, pressure is drained from a residual pressure maintaining valve 300 to restore the pressure piston 501.

At the same time, the secondary fuel (HFO, gas, etc.) which is the main fuel, after pushing the pressure piston 501, arrives in an area of a chamber B 302 which is a hole shown in FIG. 2 and stands by up to an entrance of the main nozzle hole 161, and the main needle valve 143 is opened by high pressure of the secondary fuel to inject the secondary fuel, which is the main fuel, to the main nozzle hole 161.

Thus, in a dual fuel injection valve using two kinds of fuel comprising the primary and secondary fuel, the primary fuel, which is the pilot fuel, receives pressure of the secondary fuel, which is the main fuel, to form high pressure within the cylinder/needle valve 506 and inject the primary fuel, as is the main feature of the present invention, and then the secondary fuel, which finishes pressing the primary fuel, provides pressure difference to open the main needle valve 143 by its own high pressure.

The primary fuel used herein refers to the marine diesel oil (MDO) which generally has good combustion and injection in the diesel engine, and the secondary fuel, which is the main fuel, refers to the heavy fuel oil (HFO).

Also, in a case of the gas engine, fuel such as the MDO is used as a pilot fuel for ignition, and a gas, such as LNG or a general gas is used for the main fuel.

A reference number 505 which has not been described refers to a cylindrical head, a reference number 134 refers to a drain line for discharging leak fuel and air discharged by the residual pressure, and a reference number 142 refers to a spring support. Also, a reference number 111 refers to a secondary cylinder passage in which the main needle valve 143 is disposed, and a reference number 511 refers to a primary cylinder passage in which the pressure piston 501, the primary fuel pressing piston 502, and the cylinder/needle valve 506 are disposed.

Figure 3:
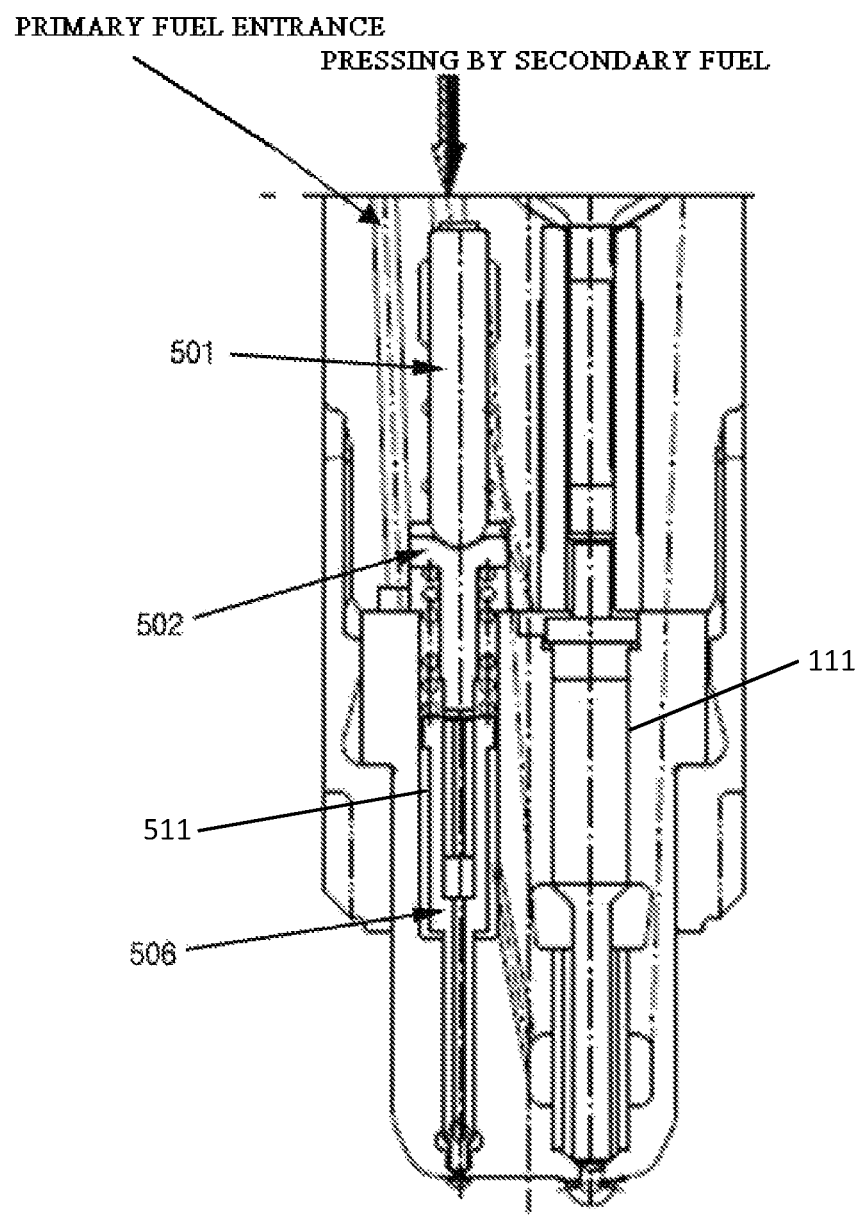
FIG. 3 is a cross sectional view illustrating an exemplary embodiment of the present invention, in which a dual fuel pressure piston is ready to be pressed by a secondary fuel.

FIG. 3 is a cross sectional view illustrating an exemplary embodiment of the present invention, in which a dual fuel pressure piston is ready to be pressed by the secondary fuel.

The primary fuel flows under general pressure, instead of high pressure, through the primary fuel passage 131 as shown in FIG. 1 and FIG. 2, and the primary fuel stands by up to the pilot nozzle hole 160. In other words, as illustrated, the primary fuel and the secondary fuel are in stand-by and, prior to pumping the secondary fuel, the primary fuel is introduced at low pressure to the pressure piston 501, the primary fuel pressing piston 502, and the cylinder/needle valve 506. Also, when the primary fuel pressing piston 502 is not being pressed by the pressure piston 501, a fuel pressing hole 504 is opened such that the primary fuel stands by up to near the pilot nozzle hole 160.

Figure 4:
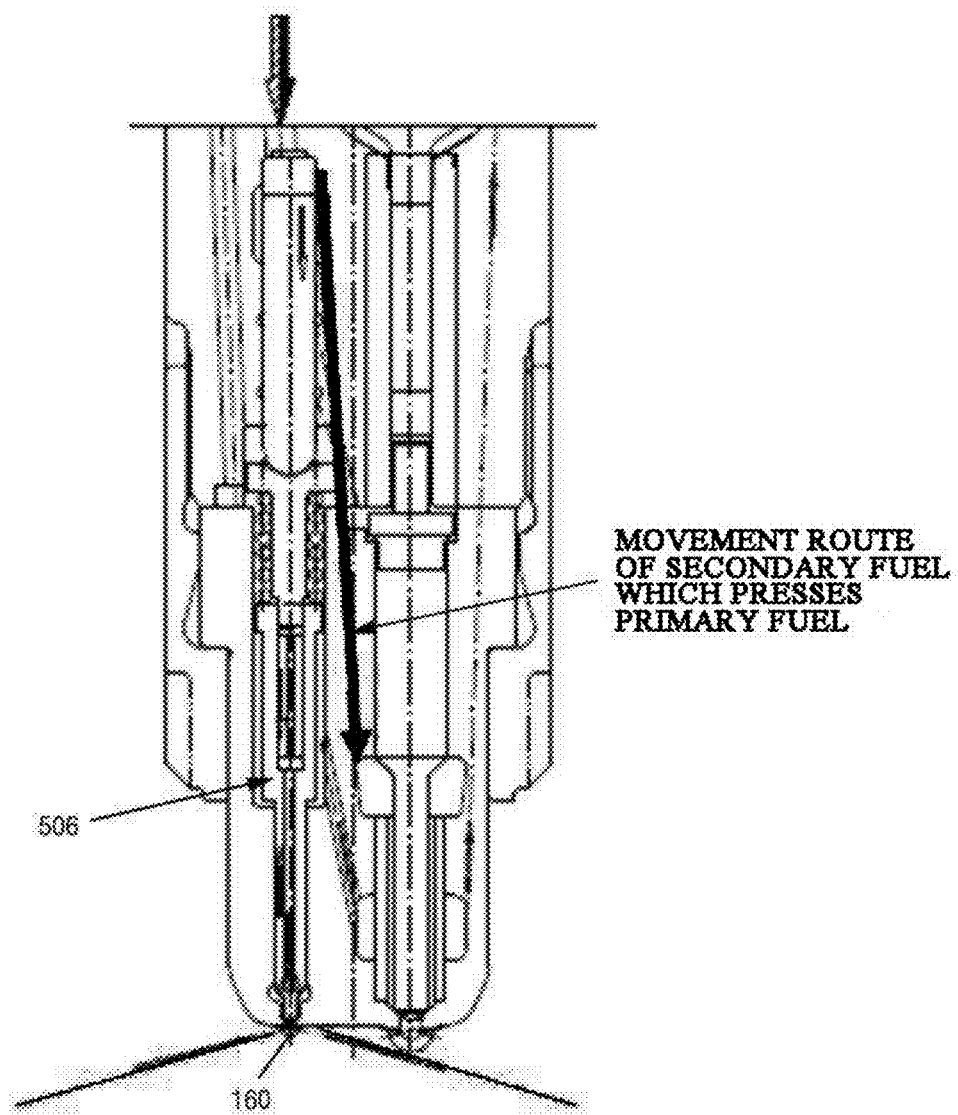
FIG. 4 is a cross sectional view illustrating an exemplary embodiment of the present invention, in which a pressure piston is pushed for pumping a primary fuel by pressure of a secondary fuel.

FIG. 4 is a cross sectional view illustrating an exemplary embodiment of the present invention, in which the pressure piston 501 is pushed by pressure of the secondary fuel, such as HFO and gas fuel, and the primary fuel (pilot fuel, MDO) is injected by the pressure. In FIG. 4, a secondary fuel passage indicated by the thick line and arrow and through which the secondary fuel flows, is not clearly shown in FIG. 1 through FIG. 4; however, the secondary fuel passage corresponds to a fuel passage indicated by a secondary fuel entrance in FIG. 7.

As illustrated in FIG. 2, when the fuel pressing hole 504 is pushed downward by the pressure of the secondary fuel which is conveyed through the pressure piston 501 and the primary fuel pressing piston 502, pressure inside the cylinder is increased to form high pressure, and then, the cylinder/needle valve 506 operates due to a pressure difference between upper and lower portions thereof, and the pilot nozzle hole 160 is opened to inject the primary fuel.

When the primary fuel injection is finished, the pressure is drained to the residual pressure maintaining valve 300, which restores the pressure piston 501 and the primary fuel pressing piston 502. At the same time, the primary fuel cylinder/needle valve 506 is closed, and the primary fuel is switched to lower pressure such that the primary fuel is directed to an area of a chamber A 301, which is a cooling area of the secondary fuel and located at a lower portion of the main needle valve 143, to cool the secondary fuel of high temperature, and subsequently, the primary fuel is drained to the outside of the injection valve block through a primary fuel drain line 139.

Figure 5:
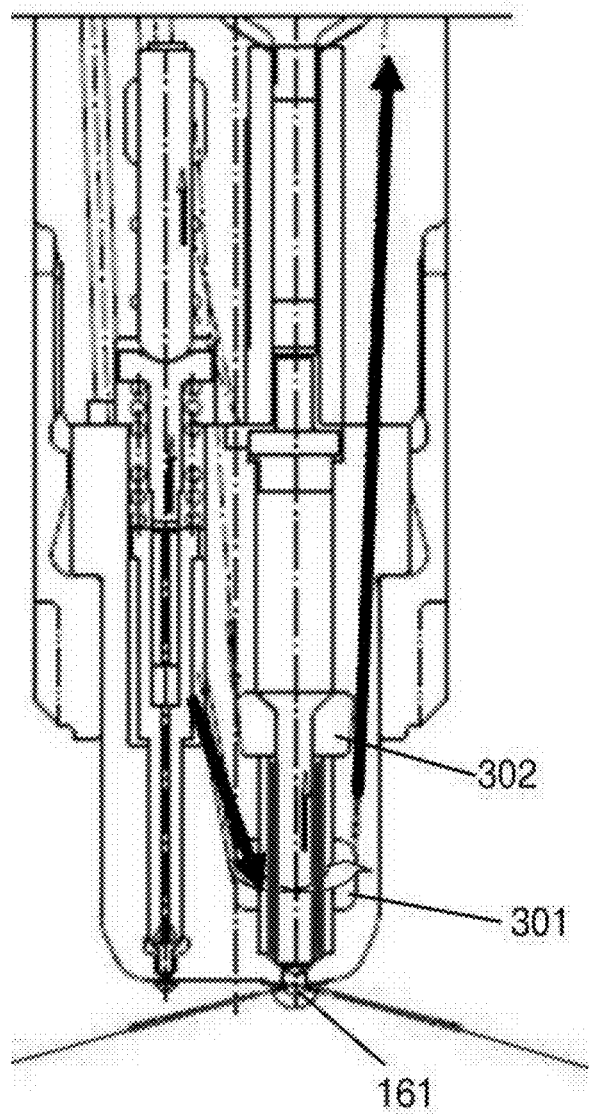
FIG. 5 is a cross sectional view illustrating an exemplary embodiment of the present invention, in which a secondary fuel is being discharging.

FIG. 5 is a cross sectional view illustrating an exemplary embodiment of the present invention, in which a secondary fuel is being discharging. As illustrated, the high pressure of the secondary fuel, which applied the pressure to the primary fuel, as described in FIG. 4, arrives to the area of the chamber B 302 and then stays around the main needle valve 143, and the main needle valve 143 is opened by a pressure difference per cross section area and the main fuel, which is the secondary fuel, is injected through the main nozzle hole 161.

Also, a bush 130 as illustrated serves as an anti-confused fuel bush which prevents the primary fuel, which is the pilot fuel, from being mixed with the secondary fuel, which is the main fuel, as well as a medium for cooling the main nozzle hole 161 at the area of the chamber A 301 by the heat exchanging.

Figure 6:
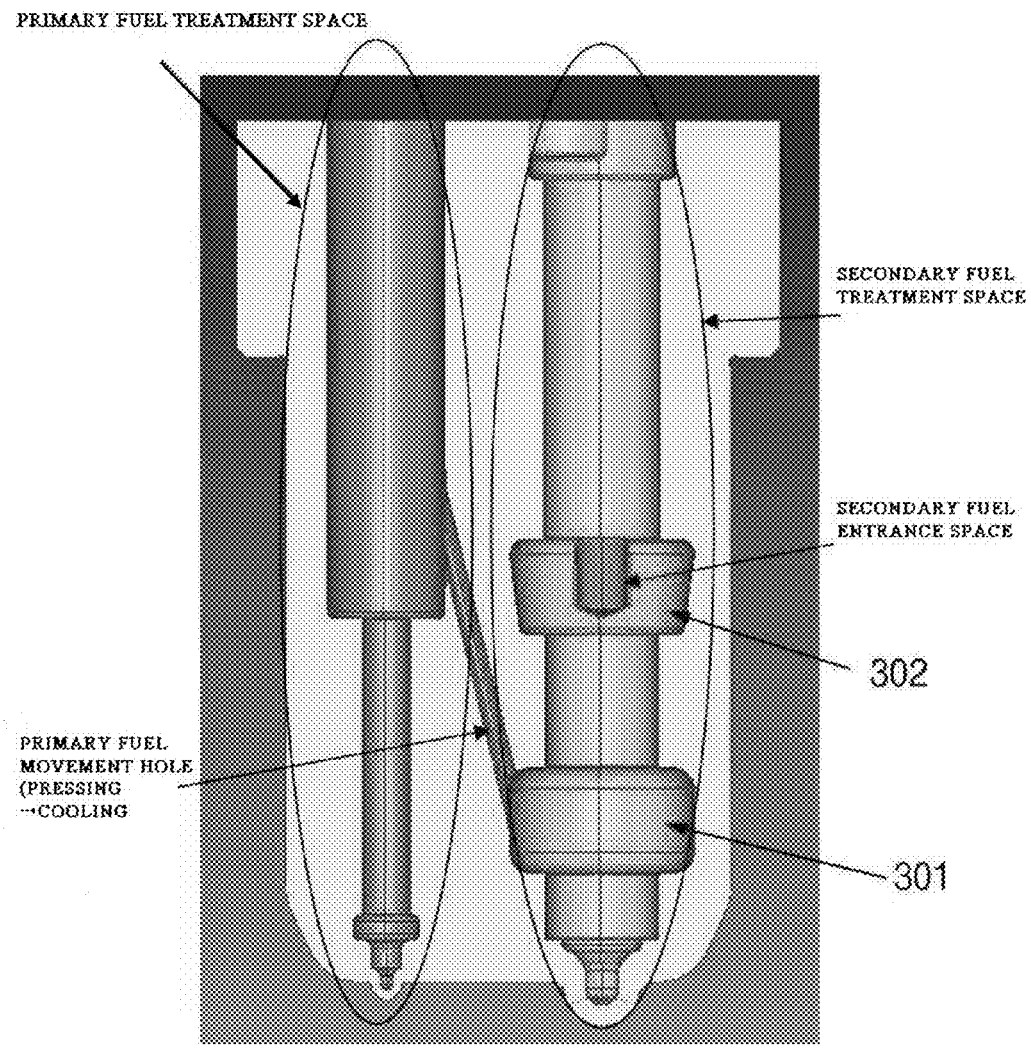
FIG. 6 is an example view showing a hybrid nozzle block according to the present invention which is cut open (a right side thereof shows a secondary fuel treatment space and a left side thereof shows a primary fuel treatment space).

FIG. 6 is a schematic view illustrating a dual hybrid nozzle block according to the present invention, wherein a right side is a secondary fuel treatment space and a left side is a primary fuel treatment space.

Figure 7:
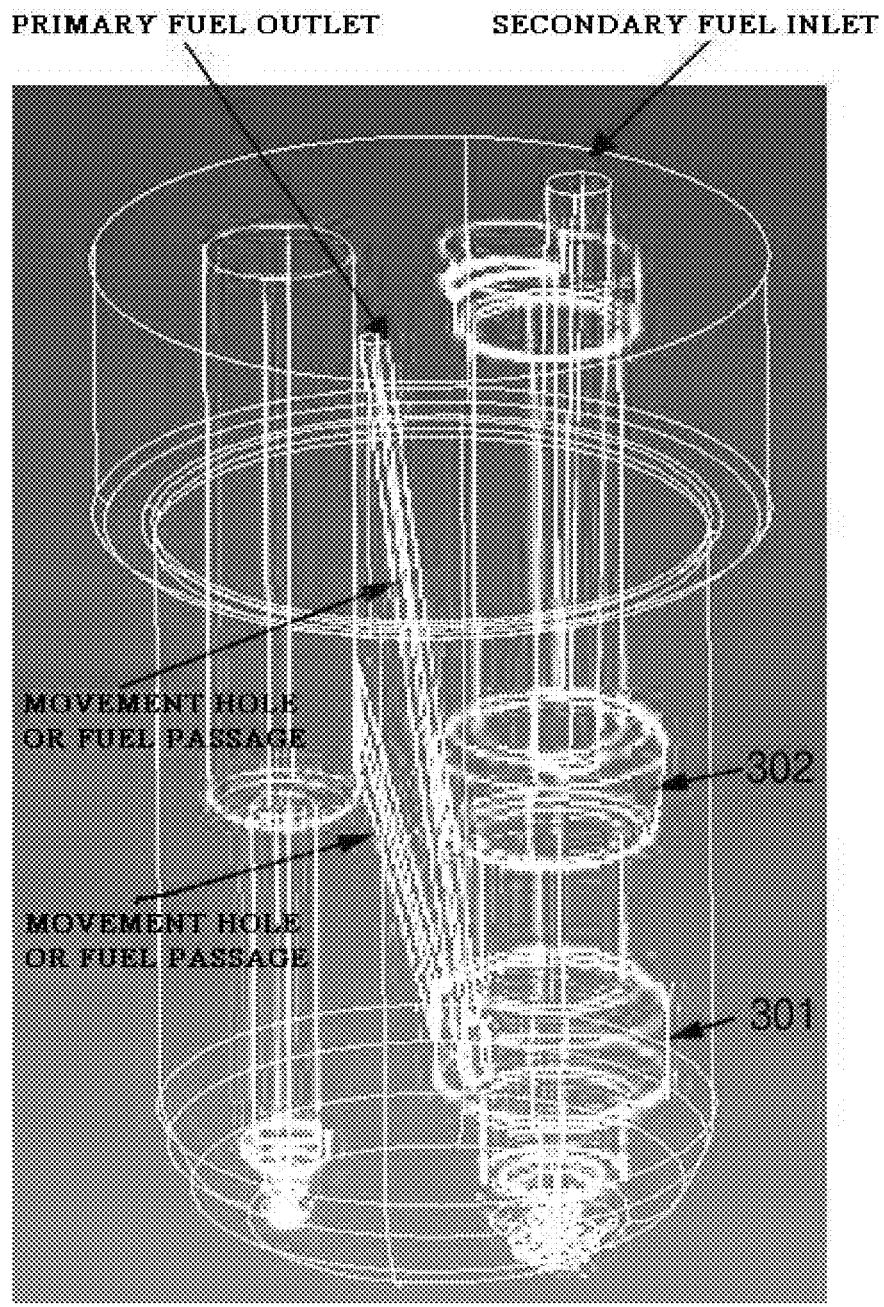
FIG. 7 is an internal configuration view illustrating an entire configuration of a hybrid nozzle block including a chamber for cooling and discharging primary fuel and secondary fuel according to the present invention.
Figure 8:
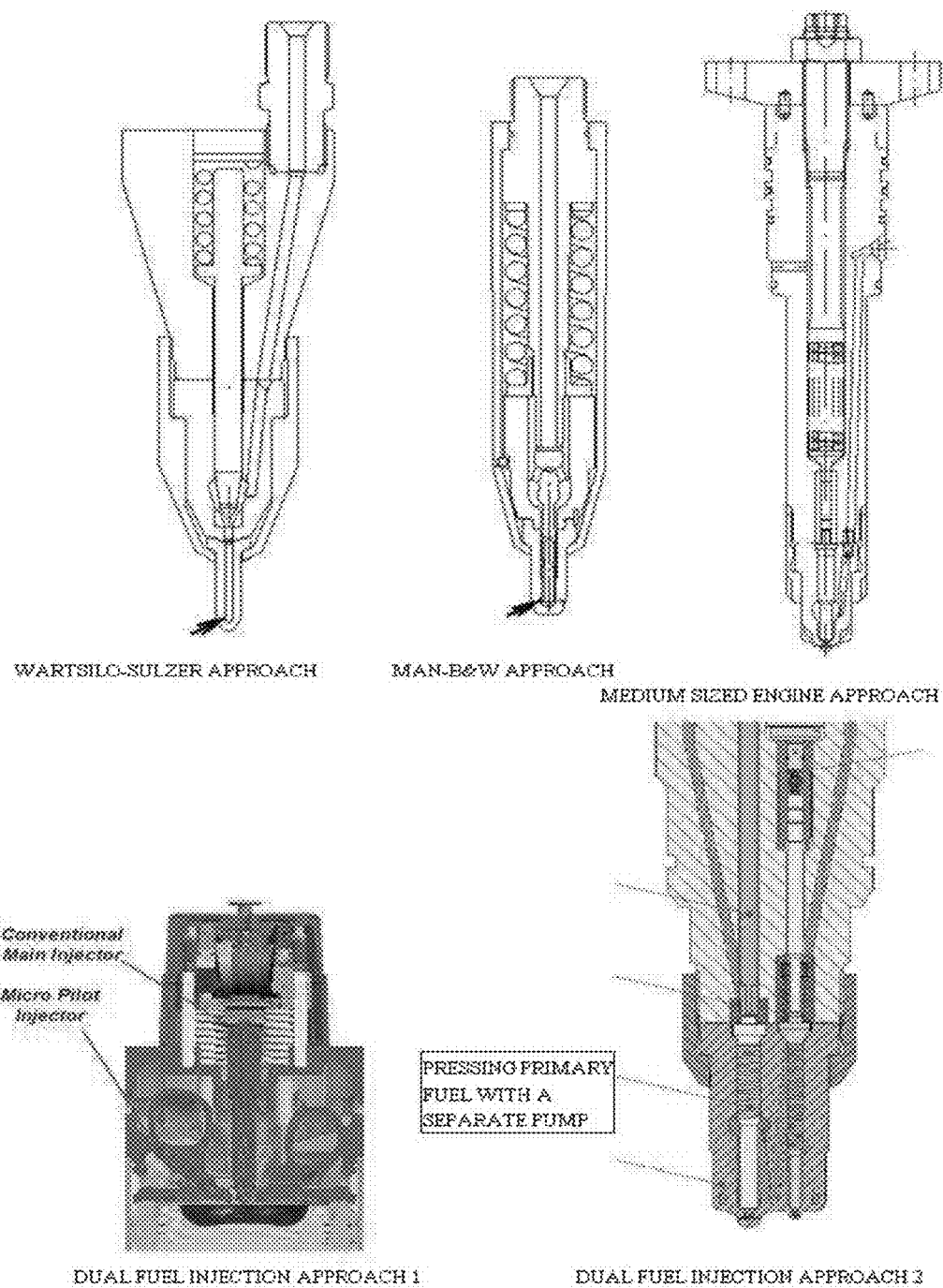
FIG. 8 is a schematic view illustrating a conventional fuel injection valve and a conventional dual fuel apparatus.

FIG. 7 is an internal configuration view illustrating an entire configuration of a dual hybrid nozzle block including a chamber A for cooling the secondary fuel and discharging the primary fuel and a chamber B for the secondary fuel, according to the present invention. As illustrated, the primary fuel is injected and the rest thereof enters to the chamber A to cool the secondary fuel and then is discharged through the primary fuel drain line 139. Also, the secondary fuel presses a primary fuel piston and then enters to the chamber B.

The present invention is not limited to particular preferable exemplary embodiments described above and it will be understood by those of ordinary skill in the art that various modifications may be made without departing from the spirit and scope of the present invention as defined by the following claims.

The invention claimed is:
1. A dual fuel injection valve comprising:
a fuel valve block;
a hybrid nozzle block coupled to an end of the fuel valve block;
a primary cylinder passage formed by the fuel valve block and the hybrid nozzle block such that a first portion of the primary cylinder passage extends through the fuel valve block and a second portion of the primary cylinder passage extends through the hybrid nozzle block;
a primary fuel passage formed to introduce a primary fuel to the primary cylinder passage;
a primary nozzle hole formed in an end of the hybrid nozzle block;
a primary needle valve disposed inside the primary cylinder passage and having a cylindrical hole formed inside an upper portion of the primary needle valve along a central axis thereof;
a secondary cylinder passage formed by the fuel valve block and the hybrid nozzle block such that a first portion of the secondary cylinder passage extends through the fuel valve block and a second portion of the secondary cylinder passage extends through the hybrid nozzle block, wherein the secondary cylinder passage is formed separately from the primary cylinder passage and disposed outside the primary cylinder passage;
a secondary fuel passage formed separately from the primary fuel passage and introducing a secondary fuel through an upper portion of the primary cylinder passage to the secondary cylinder passage;
a secondary nozzle hole formed in the end of the hybrid nozzle block separately from the primary nozzle hole;
a secondary needle valve disposed inside the secondary cylinder passage;
a first chamber disposed in the secondary cylinder passage so as to correspond to a middle portion of the secondary needle valve and formed by an inner surface of the secondary cylinder passage and an outer surface of the secondary needle valve;
a second chamber disposed between the first chamber and the secondary nozzle hole and formed to surround the secondary cylinder passage;
a bush disposed between the second chamber and the secondary cylinder passage to separate the second chamber from the secondary cylinder passage and preventing the primary fuel from mixing with the secondary fuel;
a primary fuel movement hole disposed inside the hybrid nozzle block and connecting the primary cylinder passage and the second chamber;
a primary fuel pressing piston disposed inside the primary cylinder passage coaxially with the primary needle valve and having
a lower portion movably inserted into the cylindrical hole of the primary needle valve, and
a fuel pressing hole formed such that the fuel pressing hole allows the primary fuel to flow into a lower portion of the cylindrical hole when the primary fuel pressing piston is inserted into the cylindrical hole;
a primary fuel piston spring disposed inside the primary cylinder passage to support the primary fuel pressing piston;
a pressure piston disposed inside the primary cylinder passage and on a top of the primary fuel pressing piston, the pressure piston configured to press the top of the primary fuel pressing piston by pressure of the secondary fuel passing through the secondary fuel passage; and
a residual pressure maintaining valve connected to the secondary fuel passage in order to restore the pressure piston.

2. The dual fuel injection valve of claim 1, wherein, when the primary needle valve is closed after injecting the primary fuel and the primary fuel is switched to lower pressure, the primary fuel flows through the primary fuel movement hole, the second chamber and a primary fuel drain line and cools the secondary fuel in the secondary cylinder passage.

3. A dual fuel injection valve comprising:
a fuel valve block;
a hybrid nozzle block coupled to an end of the fuel valve block; and
a primary fuel treatment space formed inside the fuel valve block and the hybrid nozzle block in a longitudinal direction;
a secondary fuel treatment space formed inside the fuel valve block and the hybrid nozzle block in the longitudinal direction, the secondary fuel treatment space being formed side by side with the primary fuel treatment space and disposed outside the primary fuel treatment space,
the primary fuel treatment space including
a primary cylinder passage formed by the fuel valve block and the hybrid nozzle block such that a first portion of the primary cylinder passage extends through the fuel valve block and a second portion of the primary cylinder passage extends through the hybrid nozzle block,
a primary fuel passage formed to introduce a primary fuel to the primary cylinder passage, and
a primary nozzle hole formed in an end of the hybrid nozzle block;
the secondary fuel treatment space including a secondary cylinder passage formed by the fuel valve block and the hybrid nozzle block such that a first portion of the secondary cylinder passage extends through the fuel valve block and a second portion of the secondary cylinder passage extends through the hybrid nozzle block, a secondary fuel passage formed separately from the primary fuel passage and introducing a secondary fuel through an upper portion of the primary cylinder passage to the secondary cylinder passage, a secondary nozzle hole formed in the end of the hybrid nozzle block separately from the primary nozzle hole, and a first chamber formed in a lower portion of the secondary cylinder passage;

a second chamber disposed between the first chamber and the secondary nozzle hole and formed to surround the secondary cylinder passage;

a bush disposed between the second chamber and the secondary cylinder passage to separate the second chamber from the secondary cylinder passage and preventing the primary fuel from mixing with the secondary fuel;

a primary fuel movement hole disposed inside the hybrid nozzle block and connecting the primary cylinder passage and the second chamber;

a primary needle valve disposed inside the primary cylinder passage and having a cylindrical hole formed inside an upper portion of the primary needle valve along a central axis thereof;

a primary fuel pressing piston disposed inside the primary cylinder passage coaxially with the primary needle valve and having
    a lower portion movably inserted into the cylindrical hole of the primary needle valve, and
    a fuel pressing hole formed such that the fuel pressing hole allows the primary fuel to flow into a lower portion of the cylindrical hole when the primary fuel pressing piston is inserted into the cylindrical hole;

a primary fuel piston spring disposed inside the primary cylinder passage to support the primary fuel pressing piston;

a pressure piston disposed inside the primary cylinder passage and on a top of the primary fuel pressing piston, the pressure piston configured to press the top of the primary fuel pressing piston by pressure of the secondary fuel passing through the secondary fuel passage; and a residual pressure maintaining valve connected to the secondary fuel passage in order to restore the pressure piston.

* * * * *